United States Patent [19]
Snow

[11] Patent Number: 6,033,460
[45] Date of Patent: *Mar. 7, 2000

[54] REACTIVE MATRIX FOR REMOVING MOISTURE FROM A FLUORINE CONTAINING GAS AND PROCESS

[75] Inventor: James T. Snow, Nashua, N.H.

[73] Assignee: Millipore Corporation, Bedford, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/069,432

[22] Filed: Apr. 29, 1998

[51] Int. Cl.[7] .............................. B01D 53/04; B01D 53/28
[52] U.S. Cl. ................... 95/117; 95/139; 95/140; 95/900; 96/108; 96/153
[58] Field of Search .............................. 95/117, 139, 140, 95/900; 96/108, 153, 154; 423/210

[56] References Cited

U.S. PATENT DOCUMENTS

| | | | |
|---|---|---|---|
| 4,853,148 | 8/1989 | Tom et al. | 252/194 |
| 4,925,646 | 5/1990 | Tom et al . | 423/488 |
| 5,656,064 | 8/1997 | Golden | 95/900 X |

FOREIGN PATENT DOCUMENTS

EP 0 337 294  10/1989  European Pat. Off. .

*Primary Examiner*—Robert Spitzer
*Attorney, Agent, or Firm*—John Dana Hubbard, Esq.; Timothy J. King, Esq.

[57] ABSTRACT

A process and composition for removing moisture from a $NF_3$ or $F_2$ gas wherein the gas is contacted with alumina particles coated with aluminum trifluoride. The aluminum trifluoride is formed by reacting alumina particles with an aqueous solution of hydrogen fluoride.

7 Claims, 2 Drawing Sheets

REACTIVE MATRIX FOR REMOVING MOISTURE FROM A FLUORINE CONTAINING GAS AND PROCESS

BACKGROUND OF THE INVENTION

1. Field of the Invention

This invention relates to a reactive matrix and a process for removing impurities from a fluorine containing gas. More particularly this invention relates to a reactive matrix and a process for removing moisture from nitrogen trifluoride gas or fluorine gas while avoiding undesirable exothermic reactions.

2. Description of Prior Art

At the present time, a wide array of supports for a reactive matrix are utilized to remove impurities from nitrogen trifluoride gas. A major problem with presently available reactive matrices is that some of the impurities in the nitrogen trifluoride such as $N_2F_2$ and $N_2F_4$ are not compatible with some of the supports presently used. These impurities decompose exothermically to catalyze the decomposition of $NF_3$ which, in turn, causes a cascade of reactions that results in undesirably high temperatures which may even destroy the housing utilized for the reactive matrix. It has been observed by Broer et al, J. Mater. Res., 1988, 3(4), 755 that reaction of components of $NF_3$ gas with alumina did not occur until 650° C. The reaction of nitrogen trifluoride with alumina at temperatures greater than 650° C. were shown by FTIR and subsequent analysis to produce nitrosyl fluoride (NOF), $NO_2$, NO and $AlF_3$.

It also has been shown in Japanese patent 01261209 (1989) that the purification of $NF_3$ with previously dehydrated alumina within a temperature range of 0 to −125° C. removes impurities of $N_2O$, $CO_2$ and $N_2F_2$. The cold temperature minimized the adsorption of $NF_3$ onto the alumina support.

Japanese patent 0203450 A2 (1990) discloses that purification of $NF_3$ in stages prevents any temperature increases and subsequent explosions. $N_2F_2$ and $N_2F_4$ are first removed by passing the $NF_3$ gas through a metallic tube, e.g. stainless steel or Monel, at 150–300° C. Subsequently, $OF_2$ is removed by bubbling the gas through an aqueous solution containing $Na_2SO_3$ and $Na_2S$. The purified $NF_3$ then flows through a previously activated alumina layer for removal of $N_2O$ and $CO_2$. Both of these impurities are present in concentrations higher than water.

U.S. Pat. Nos. 4,853,148 and 4,925,646 disclose the use of aluminum trifluoride on an alumina support to remove moisture from a hydrogen halide gas. The aluminum trifluoride is formed by reaction of corresponding partially or fully alkylated compounds and/or pendant functional groups with the corresponding gaseous hydrogen halide. The partially or fully alkylated compounds are utilized as a solution in an organic solvent. Formation of aluminum trifluoride or aluminum by this process results in trace amounts of organic moieties or compounds being present on the resultant product. Even trace amounts of organics on a material used to purify $NF_3$ are undesirable since they react with $NF_3$ or impurities in $NF_3$ in an exothermic reaction which generates sufficient heat to cause further undesirable reaction of the $NF_3$.

In addition, formation of $AlF_3$ via reaction of the starting material, $AlR_3$, where R is an organic moiety, is not practical with gaseous HF since gaseous HF has a low vapor pressure and excess unreacted HF is difficult to remove from the support. Furthermore, formation of $AlF_3$ from aluminum hydride and HF gas cannot be done with HF in aqueous solution since water reacts with aluminum hydride.

Accordingly, it would be desirable to provide a scavenger for moisture in $NF_3$ which does not react with $NF_3$ or with impurities normally found in $NF_3$. In addition, it would be desirable to provide such a scavenger which does not react with compounds which are adsorbed by the scavenger.

SUMMARY OF THE INVENTION

The present invention provides particulate composition, a process and an apparatus for removing moisture from a gas containing fluorine gas or nitrogen trifluoride gas while avoiding undesirable exothermic reactions. The apparatus of this invention comprises a housing containing a particulate composition which is an active scavenger for removing moisture from $NF_3$. The housing includes an inlet for feed $NF_3$ and an outlet for treated $NF_3$. The particulate composition comprises particles formed from alumina coated with $AlF_3$ which is formed by reacting alumina particles with an aqueous solution of hydrogen fluoride (HF). Alternatively, the $AlF_3$-coated alumina particles can be formed by the controlled reaction of alumina particles with gaseous HF or HF/inert gas mixtures. $AlF_3$ particles formed in this manner are free of moieties, such as organic moieties which are reactive with either $F_2$, $NF_3$ or impurities normally found in $F_2$ or $NF_3$.

Moisture removal from $F_2$ or $NF_3$ is effected by passing the $F_2$ or $NF_3$ gas through a bed of the particles under conditions to effect adsorption of moisture from the $NF_3$. The adsorbed moisture is chemically bound in hydrate formation with the aluminum trifluoride. The alumina particles also adsorb oxides of carbon, i.e., carbon monoxide and carbon dioxide, when these oxides are present in the gas. The alumina particles additionally will remove trace levels of HF gas in $NF_3$ via chemisorption to produce additional $AlF_3$ and moisture. The generated water vapor will be scavenged by the reactive matrix. Since the particles prepared in accordance with this invention do not react exothermically with compounds normally found in $NF_3$ gas, removal of the moisture from $NF_3$ is effected without a significant increase in temperature or pressure.

DESCRIPTION OF SPECIFIC EMBODIMENTS

In accordance with the process of this invention, a gas containing fluorine gas or $NF_3$ gas is contacted with particles of an alumina support coated with aluminum trifluoride made by reacting alumina particles having an average size between about 0.1 and about 10 mm preferably between 1.0 and 5.0 mm with an aqueous solution of hydrogen fluoride until substantially the entire surface of the aluminum particles is coated with $AlF_3$. Reaction is conducted with an aqueous solution containing between about 1% and about 10%, preferably between about 3% and about 5% hydrogen fluoride at a temperature between about 0° C. and about 40° C., preferably between about 20° C. and about 30° C. The particles then are recovered and dried to remove any moisture therein. Typical drying conditions comprise a temperature greater than 100° C. and preferably greater than 200° C.

The NF$_3$ or F$_2$ can be treated alone or in admixture with an inert gas such as argon, neon or xenon.

The moisture removal capacity or efficiency of the active scavenger for removing moisture is not affected by the presence of other impurities such as oxides of carbon that would preferentially compete with moisture for binding to the support. In addition, the particles of alumina coated with aluminum fluoride prepared in accordance with this invention are capable of adsorbing moisture from F$_2$ or NF$_3$ gas without reacting with impurities normally found in NF$_3$ or F$_2$.

Figure 1:
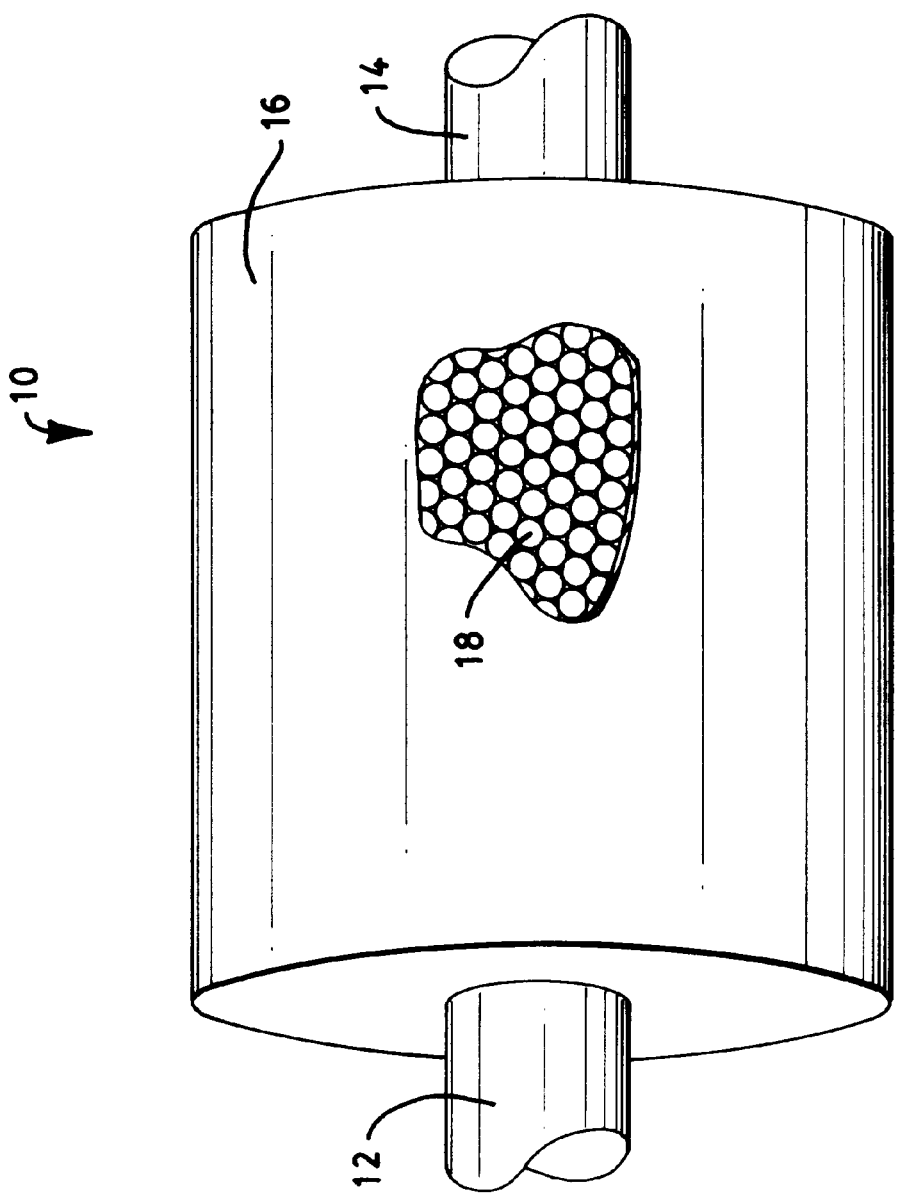
FIG. 1 is a schematic drawing of an apparatus of this invention.

FIG. 1 illustrates the use of the present invention. Referring to FIG. 1, an apparatus of this invention 10 includes an inlet 12, an outlet 14 and a housing 16. Particles 18 comprise alumina particles coated with AlF$_3$ prepared by reacting alumina particles with an aqueous solution of hydrogen fluoride.

The following examples illustrate the present invention and are not intended to limit the same.

EXAMPLE 1

A 50-cc sample of aluminum trifluoride on alumina is prepared according to the following procedure. To aluminum oxide (32.5 g) in a PFA bottle is added a diluted solution of 49% aqueous HF (4.1 ml) in deionized water (50 ml). After three hours, the liquid is decanted and the remaining aluminum trifluoride on alumina is allowed to air dry in the fume hood overnight. The material is transferred to a sample cylinder where further drying and dehydration of the aluminum trifluoride is accomplished at 400° C. for three hours under a 3.0-slpm flow of nitrogen.

EXAMPLE 2

The capacity of the aluminum trifluoride on alumina scavenger for the removal of water vapor is measured according to the following procedure. A 50-cc sample cylinder is filled with the AlF$_3$/alumina scavenger prepared in Example 1. A test gas mixture of 480-PPM H$_2$O in nitrogen is passed through the sample tube at a flow rate of 1.0 slpm. The downstream H$_2$O concentration is measured using an Ametek 5700 Moisture Analyzer. After 2760 min, H$_2$O breakthrough is detected to provide a H$_2$O capacity for the inorganic scavenger of 26 L H$_2$O/L bed.

EXAMPLE 3

Figure 2:
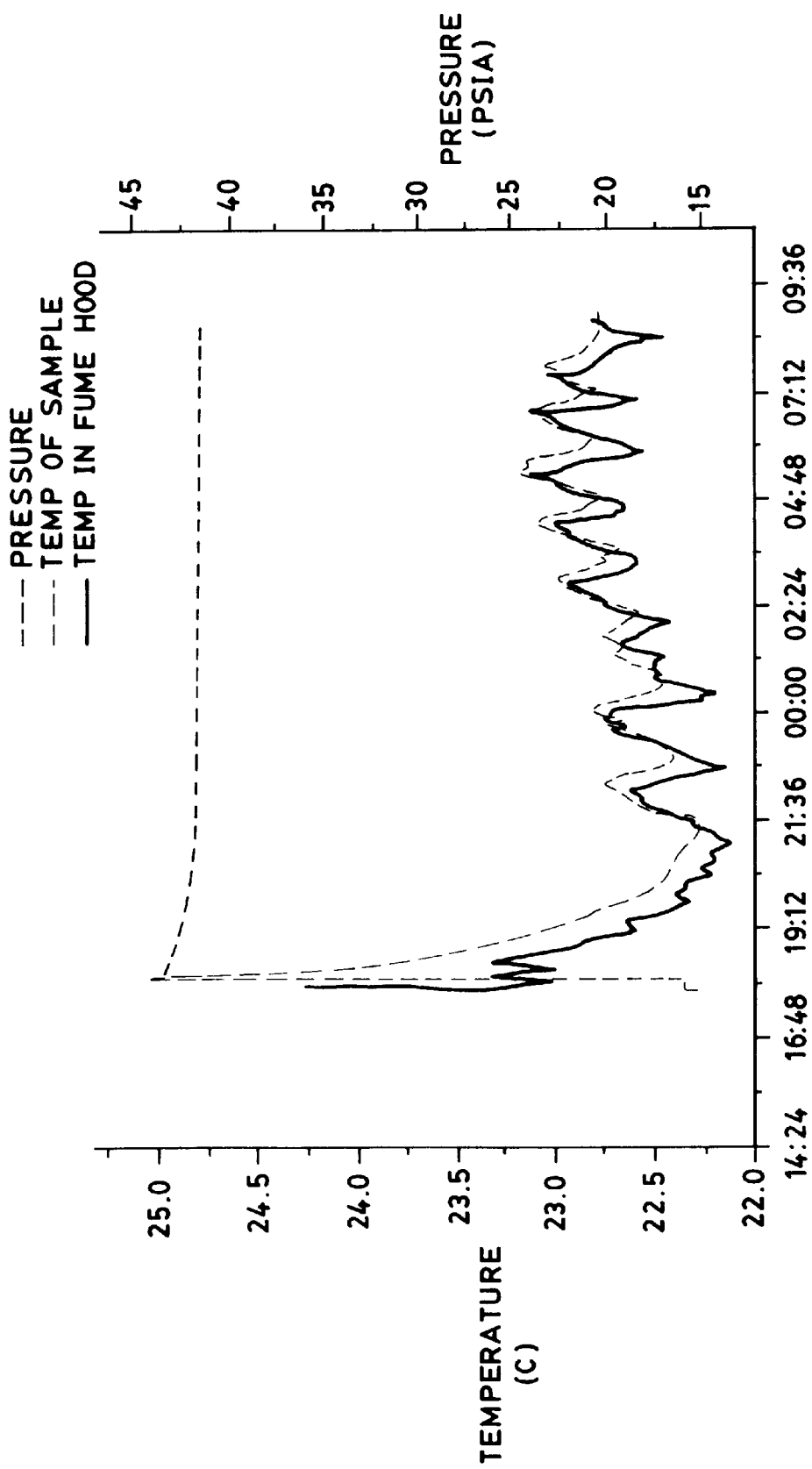
FIG. 2 shows the change in temperature and pressure over time when treating $NF_3$ to remove moisture in the apparatus of this invention.

The compatibility of the aluminum trifluoride on alumina scavenger to NF$_3$ gas is determined according to the following example. A 50-cc sample cylinder is filled with the AlF$_3$/alumina scavenger prepared in Example 1. The sample cylinder is equipped with a thermocouple inserted through the side via compression fitting to measure the internal temperature of the scavenger. The sample cylinder is installed on a manifold with an optional by-pass loop around the sample. A 200-sccm flow of NF$_3$(CP grade) is either passed through the sample cylinder or optionally bypassed (to provide background level). The flow of NF$_3$ is initiated then passed through the sample and, as shown in FIG. 2., there is no appreciable increase in temperature. The downstream by-passed and purified NF$_3$ gas spectra are measured using a FTIR and are observed to be identical. The sample is pressurized to 43.30 psia, valved off and left static overnight. The pressure remains constant overnight and FTIR analysis of the sample head space shows no generation of impurities.

I claim:

1. A particulate composition suitable for removing moisture from a gas selected from the group consisting of nitrogen trifluoride gas and fluorine gas, which comprises:

particles of alumina having a coating of aluminum trifluoride, said coating being formed by reacting said particles of alumina with an aqueous solution of hydrogen fluoride followed by drying said particles of alumina coated with said aluminum trifluoride.

2. The process for removing moisture from a gas selected from the group consisting of nitrogen trifluoride gas and fluorine gas which comprises intimately contacting said gas with the composition of claim 1 and recovering said gas after contacting with the composition of claim 1.

3. The process of claim 2 wherein said gas is nitrogen trifluoride.

4. The process of claim 3 wherein said gas contains an inert gas.

5. The process of claim 2 wherein said gas if fluorine gas.

6. The process of claim 5 wherein said gas contains an inert gas.

7. An apparatus for removing moisture from a gas selected from the group consisting of nitrogen trifluoride gas and fluorine gas which comprises a housing containing the composition of claim 1, an inlet into said housing and an outlet from said housing.

* * * * *